(12) United States Patent
Cheng et al.

(10) Patent No.: US 7,150,279 B2
(45) Date of Patent: Dec. 19, 2006

(54) COOKING VESSEL WITH MULTIPLY RINGED BOTTOM SURFACE

(75) Inventors: Stanley Kin Sui Cheng, Vallejo, CA (US); Roberto Tarenga, Milan (IT)

(73) Assignee: Meyer Intellectual Properties Limited (VG)

( * ) Notice: Subject to any disclaimer, the term of this patent is extended or adjusted under 35 U.S.C. 154(b) by 0 days.

(21) Appl. No.: 10/883,112

(22) Filed: Jun. 30, 2004

(65) Prior Publication Data

US 2006/0042623 A1     Mar. 2, 2006

(51) Int. Cl.
A47J 27/00    (2006.01)
A47J 36/00    (2006.01)

(52) U.S. Cl. .............. 126/390.1; 126/375.1; 220/626; 220/573.1

(58) Field of Classification Search ............. 126/373.1, 126/390.1, 376.1, 375.1; 99/447; 220/626, 220/912, 627, 573.3, 573.1
See application file for complete search history.

(56) References Cited

U.S. PATENT DOCUMENTS

| | | | | |
|---|---|---|---|---|
| 4,432,340 A | * | 2/1984 | Conant et al. | 126/390.1 |
| 4,508,100 A | * | 4/1985 | Deville | 126/390.1 |
| 4,596,236 A | * | 6/1986 | Eide | 126/390.1 |
| 4,927,997 A | * | 5/1990 | Bailey | 126/215 |
| 5,564,590 A | * | 10/1996 | Kim | 220/626 |
| 5,711,290 A | * | 1/1998 | Kim | 126/390.1 |
| 5,845,805 A | * | 12/1998 | Ragland | 220/573.3 |
| 6,267,830 B1 | * | 7/2001 | Groll | 220/573.1 |

FOREIGN PATENT DOCUMENTS

GB     2 121 674 A    *    1/1984

* cited by examiner

*Primary Examiner*—Josiah C. Cocks
(74) *Attorney, Agent, or Firm*—Edward S. Sherman

(57) ABSTRACT

A cooking vessel is formed with one or more annular rings rising above a laminate structure that exposes at least one more thermally conductive material of a contrasting color. The raised rings reveal the nature of the thermally conductive material, yet protect it from scratches and abrasion during use, such as when the cooking vessel is resting on a stove top.

22 Claims, 10 Drawing Sheets

COOKING VESSEL WITH MULTIPLY RINGED BOTTOM SURFACE

CROSS REFERENCE TO RELATED APPLICATIONS

None

BACKGROUND OF INVENTION

The present invention relates to improve cooking vessels, in particular those having more durable wear resistant bottom surfaces.

Cooking vessels, such as pots and pans, are constructed out of a wide variety and combinations of metals as well as non-metallic coatings. Certain materials are selected for their heat transfer properties, while others are deployed as external surfaces, and frequently selected to improve durability in that they offer a consistent external appearance, despite the propensity for scratching or marring that occurs from contact with heating elements during use, stirring utensils or cleaning agents.

Copper in particular is a favorite material for constructing cooking vessels, because of its unique appearance, but also for its superior heat transfer properties compared to other metals. A popular design for cooking vessels is to utilize a laminate construction in which a layer of copper is sandwiched between other materials that form the interior of the cooking vessel as well as the bottom surface of the cooking vessel. However, these constructions, while protecting the copper layer from abrasion that will degrade the appearance, also hide the copper. This can be disadvantageous to manufactures as well, as the presence of copper in the construction will not be readily apparent to consumers, who might confuse such products with inferior merchandise. Thus, consumers looking for copper based cookware, may readily forego purchasing such products although they might have nearly equivalent heat transfer properties compared to pure copper cookware products.

It is therefore a first object of the present invention to provide cooking vessels that predominantly display the copper construction in their bottom surface.

It is a further object of the invention to provide cooking vessels constructed predominantly of copper, in which the copper in the bottom surface is protected from scratches or mars that might arise from contact with heaters and other burner elements.

SUMMARY OF INVENTION

In the present invention, the first object is achieved by forming a cooking vessel having a copper sheet or plate partially laminated between one or more exterior layers, such as stainless steel or another hard or durable material, with regions of the copper exposed where the hard or durable material is absent. Thus, the stainless steel extends from the bottom of the pan as a profile to protect the visible, but indented, copper layer from scratches and abrasion by the heaters or burner elements.

A second aspect of the invention is characterized in that the hard durable material in the exterior laminate layer is partially removed to expose one or more rings of copper that are concentric with the center of the pans, being recessed below the hard durable exterior layer and thus protected from abrasion during cooking.

The above and other objects, effects, features, and advantages of the present invention will become more apparent from the following description of the embodiments thereof taken in conjunction with the accompanying drawings.

DETAILED DESCRIPTION

Figure 1:
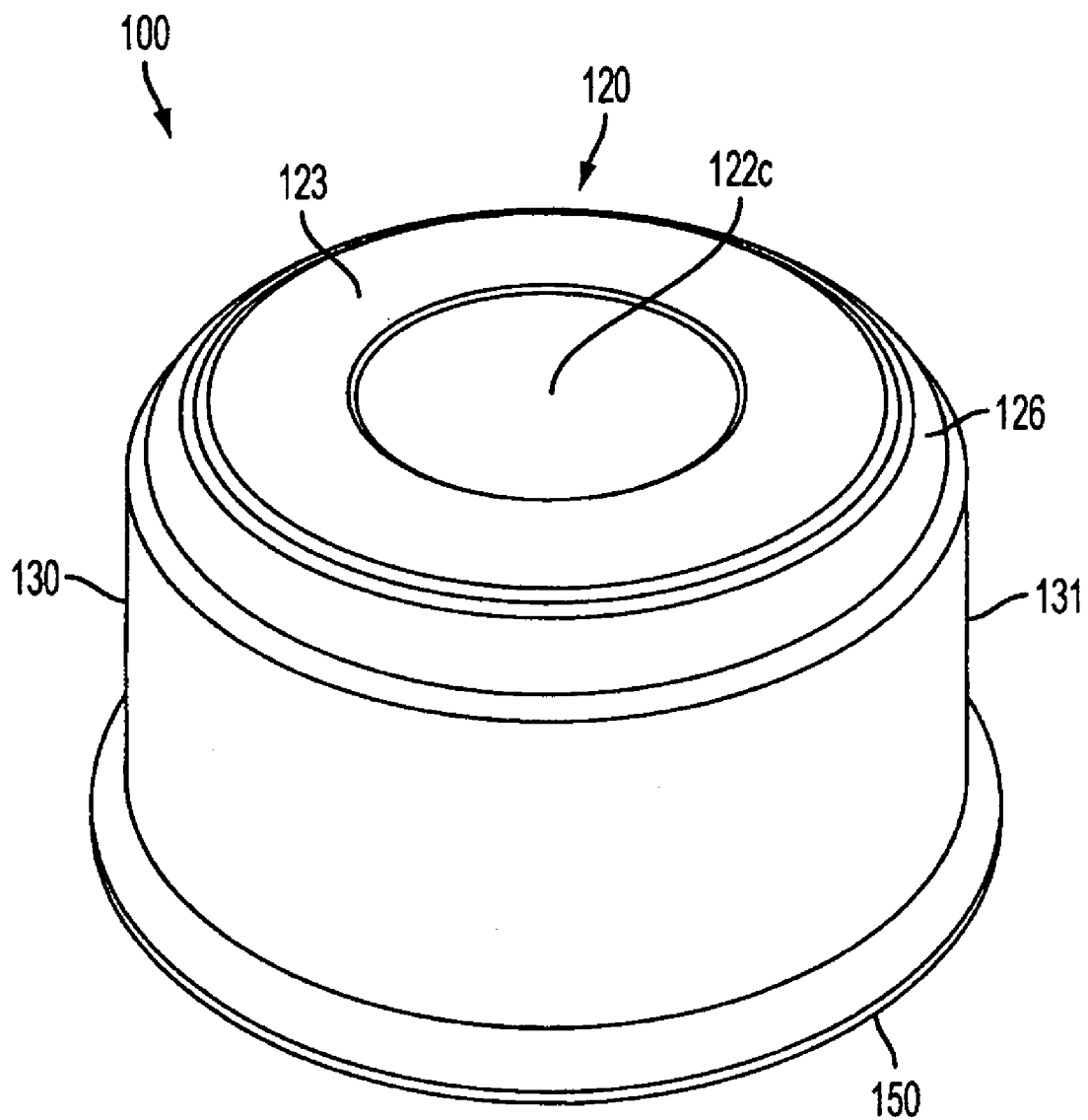
FIG. 1 is a prospective view of the bottom surface of a cooking vessel according to a first embodiment of the invention.

In accordance with the present invention, FIG. 1 depicts an inverted cooking vessel 100 of a first embodiment, in which external bottom surface 120 is upright and surrounded by upright wall 130 that extends therefrom, having outer surface 131. Upright wall 130 extends to outer rim to define the fluid retaining cavity 140. Accordingly, for the purposes of this illustration cooking vessel 100 may be considered to be resting on rim 150.

Figure 2:
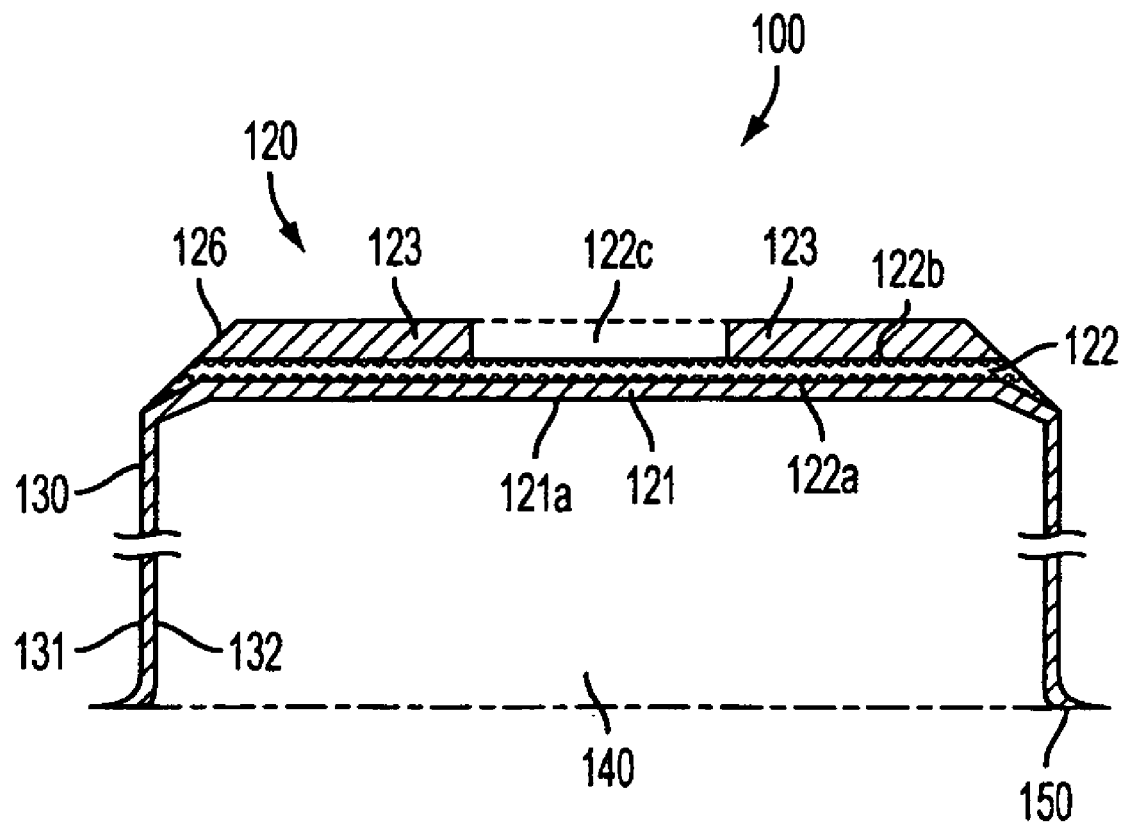
FIG. 2 is a cross-sectional elevation showing the laminate construction of the cooking vessel in FIG. 1.

FIG. 2 is a cross-sectional illustration showing the laminate construction of cooking vessel 100 in FIG. 1 The bottom 120 of cooking vessel 100 comprises at least three layers of materials, with the upper or outer layer 123, (that is at the bottom of the pan when the FIG. is inverted for normal use) being discontinuous, as it extends above the middle layer 122. Accordingly, when cooking vessel 100 is resting on a burner or stove top in the normal non-inverted position, only the outer layer 123 makes contact with the supporting surface. While the inner layer is preferably copper, other substitutes include copper alloys as well as a copper clad layer of another thermally conductive material in particular aluminum. A portion 122c of layer 122 is exposed in this perspective view. Also at the bottom edge of the pan 126 inner layer 122 is exposed. In a preferred embodiment, the inner surface 121a of the fluid retaining cavity 140 at the bottom of cooking vessel 100, the first layer 121 is the same material that forms upright wall 130, being contiguous from inner wall surface 132 across the bottom inner surface 121a, to line the inside of fluid retaining cavity 140. Next, a copper layer 122 is disposed above layer 121, forming an interface 122a therewith. The inner copper layer, 122 is thus surrounded by bottom 133, having a continuous interface 122a therewith, and partially covered by an outer layer 123, which forms a discontinuous interface 122b therewith, but projects outwards from the bottom surface of the cooking vessel 100. The copper layer 122 provides high thermal conductance between the last or outer layer 123, such that surface 121a reaches a substantially uniform temperature over its width or lateral dimension. As outer layer 123 only partially covers copper layer 122, at interface 122b, a central region 122c of the copper layer is exposed at the center of bottom 120. Further, as layer 122 extends to the outer edge of the pan, being warped or deformed to conform to the contour of inner surface 121, it is exposed as portion 126 of side wall exterior surface 131. Thus, the upper or outer layer 121 projects outward from the middle layer 122 in normal use such that the cooking vessel will rest on outer layer 123. Accordingly, the visible portion 122c of the middle layer 122 will not be subject to damage from the supporting surface, that is a gas burner ring, electric heating element and the like. As the middle layer 122 is preferably copper and the outer layer is preferably stainless steel, the configurations available in the various embodiments reveal that the cooking vessel processes the superior thermal characteristics of copper cookware, while at the same time offering the greater durability and more consistent shiny appearance afforded by constructing the outer layer 123 of stainless steel. In the preferred embodiments the outer layer has a thickness of between about 0.5 mm to 2 mm, whereas the copper layer has a preferred thickness of about 1 to 2 mm.

Figure 3:
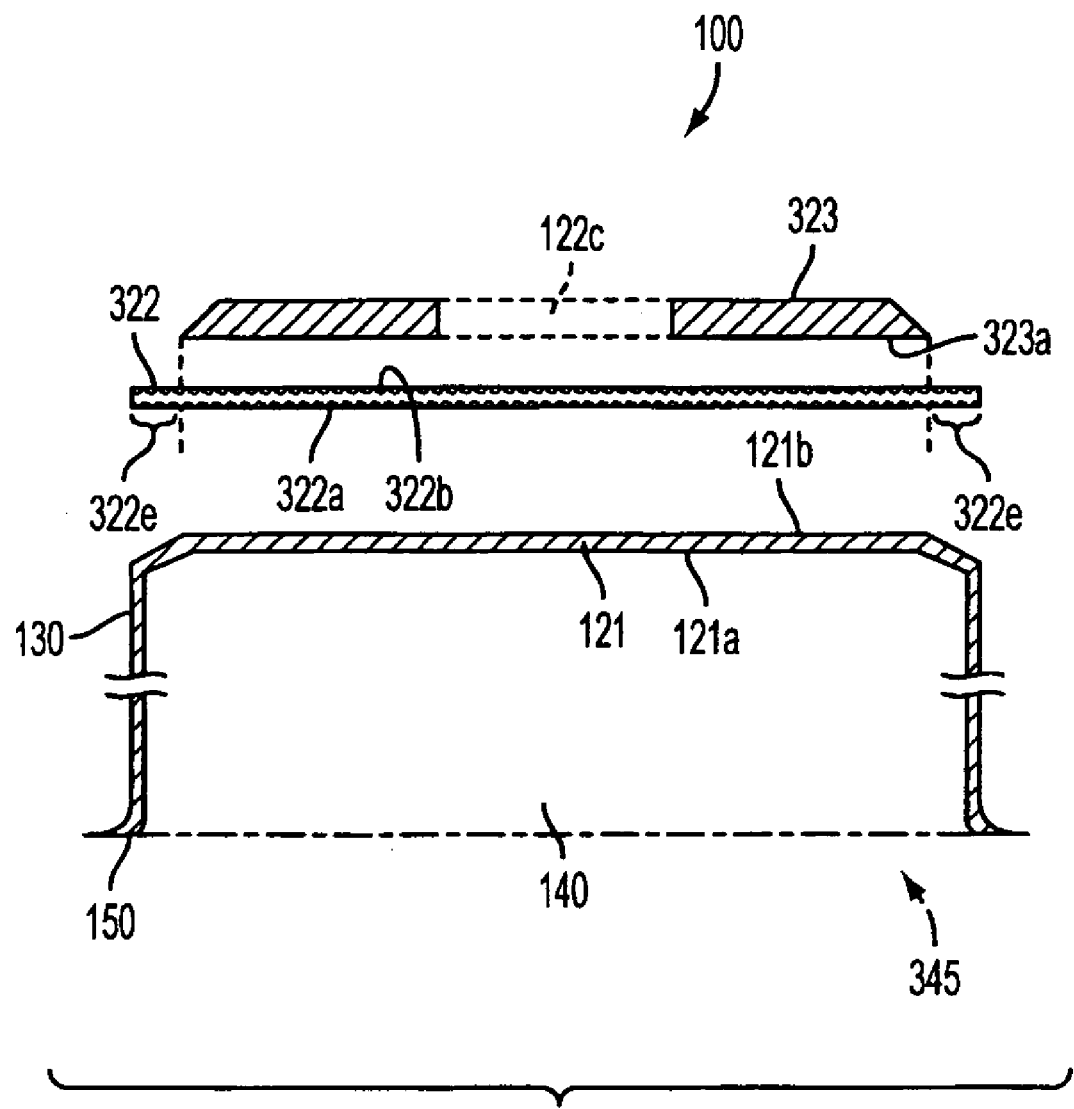
FIG. 3 is a cross-sectional elevation showing the method of forming the laminate construction of the cooking vessel in FIG. 1.

FIG. 3 is a cross-sectional elevation to illustrate a method of forming the laminate construction of the cooking vessel in FIG. 1. In this embodiment, cooking vessel 100 is formed from three components, 323, 322 and 345. The first component is an upper disk 323 having a concentrically disposed circular hole that defines opening 122c in FIG. 1. The second component is a circular plate of copper 322, which ultimately is bonded, at surface 322a, to the outer bottom surface 121b of a fluid containing vessel 345 to form middle layer 122 in FIG. 2. The other side 322b of copper plate 322 is bonded to the bottom surface 323a of upper disk 323, laminating the copper layer between the bottom portion 121 of the liquid containing vessel 345 and the upper disk 323. The upper disk 323 is optionally bonded to the copper plate at the same instance that copper plate 322 is bonded to surface 121b of vessel 345 by impact or friction bonding. Further, as the upper disk 323 is smaller in diameter than the projected diameter between walls 130 of fluid containing vessel 345, portions 322e of copper plate 322 extends outside the perimeter of disk 323. Thus, in the impact bonding process these portions 322e are deformed to form the side edge 126, as shown on the finished cooking vessel 100 in FIG. 2.

In this embodiment, the impact bonding die in contact with surface 323b of upper disk 323 is preferably contoured to match the exterior profile of the finished outer surface of bottom portion 122 such that sufficient pressure is applied to the area that forms interface 122a directly below region 122c. Further, product or brand identifying information may be embossed in the copper plate 122 during the impact bonding process in region 122c. As alternative methods of fabrication will be described with respect to other embodiment, it should be understood that the method of fabrication are substantially interchangeable to achieve the same result regardless of the profile in bottom portion 120 of the cooking vessels disclosed in the various figures.

Figure 4A:
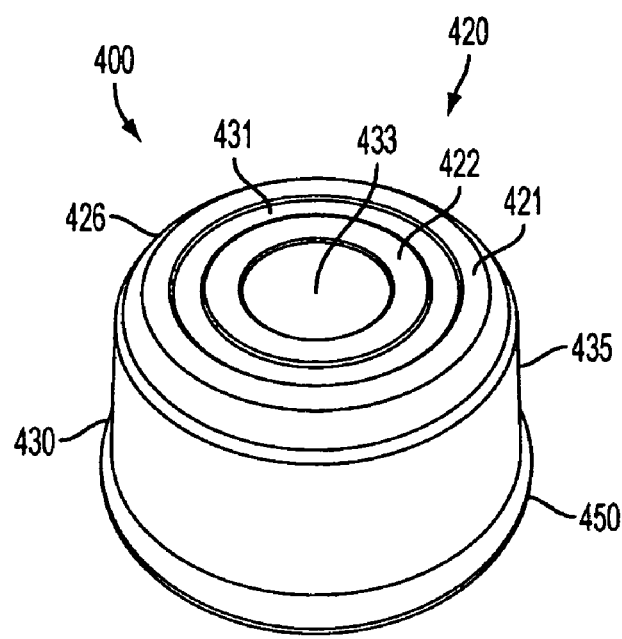
FIG. 4A is a prospective view of the bottom surface of a cooking vessel according to a second embodiment of the invention.
Figure 4B:
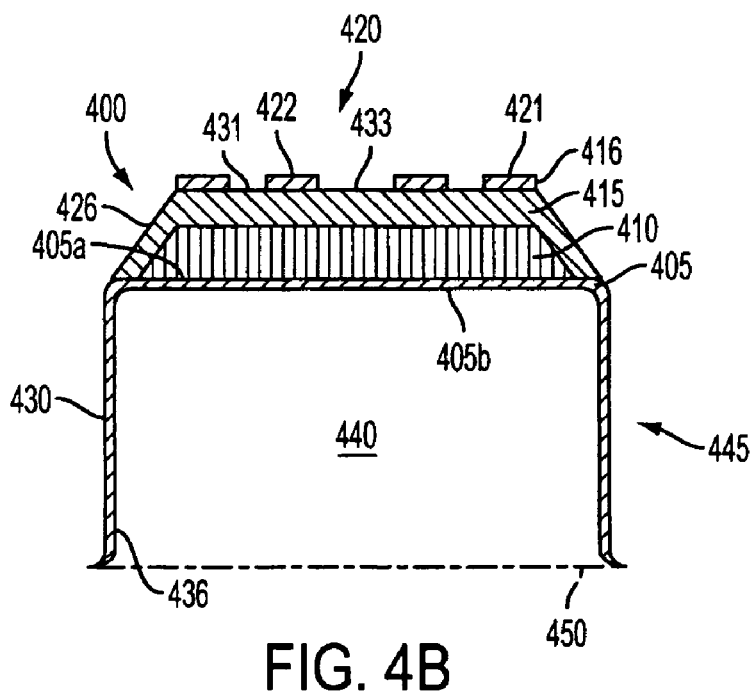
FIG. 4B is a cross-sectional elevation of the cooking vessel in FIG. 4A.
Figure 5A:
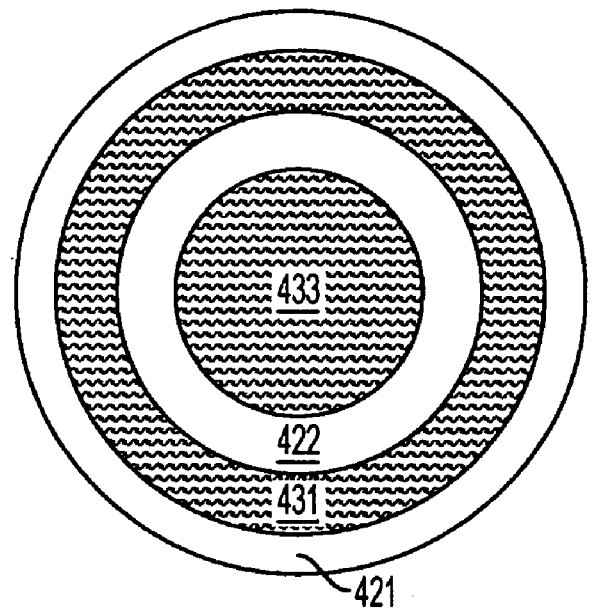
FIG. 5A is a partial cut-away of an elevational cross-section showing the laminate construction of the cooking vessel in FIG. 3.
Figure 5B:
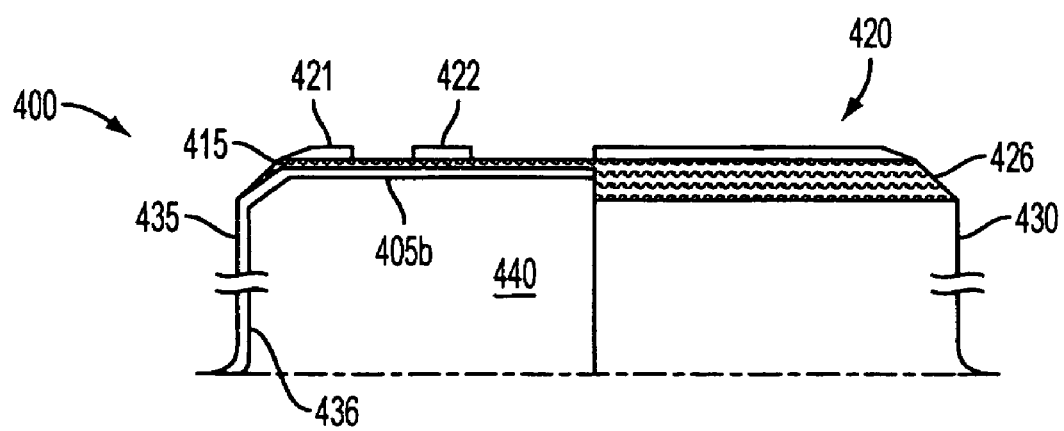
FIG. 5 B is plan view corresponding to FIG. 5A.

FIG. 4A is a prospective view of the bottom surface of a cooking vessel 400 according to a second embodiment of the invention. Cooking vessel 400 has a circular bottom portion 420 surrounded by substantially upright wall 430 connected at the periphery thereof FIG. 4A shows the outside portion 435 of wall 430 whereas FIG. 4B shows the inner portion 436 of wall 430 which define an inner fluid retaining cavity 440. Cavity 440 extends from the inside bottom 421 of the vessel to rim 450, which flairs outward at the unconnected end of wall 430. Wall 430 and bottom 405 that define cavity 440 are integral to a vessel portion 445, whereas the remainder of the bottom 420 of vessel 400 is formed by adjacent layers 410, 415 and 416 with layer 410 being disposed in contact with the outer surface 405a of bottom 406 of vessel portion 445. FIG. 4B also displays the laminar construction of bottom portion 420, starting from inner or cooking surface 405b, layer 410, which is preferably aluminum, or a suitable alloy thereof, and an outer layer 416 of stainless steel to surround a middle layer 415, which preferably comprises copper, or an alloy thereof FIG. 5A is a plan view of the bottom portion 420 of cooking vessel, and is aligned with the partial cut-away portion of the corresponding elevation in FIG. 5B to further illustrate the location and definition of the recesses 433 and 431 that display middle layer 415, being disposed between extending rings 422 and 421. In use the upright cooking vessel 400 rests on the outward extending portions of layer 416, which is arranged as concentric rings 421 and 422. It should be appreciated that in FIG. 4B the vertical axis is greatly expanded to illustrate the detailed construction of the laminated layers that form bottom portion 420.

The extending portions of layer 416 form concentric rings to define recessed portions that expose layer 415. Thus, the outer surface of bottom portion 420 includes a concentric circular cavity 433. The nature and/or composition of middle layer 415 is also exposed in region 426, at the edge of the cooking vessel adjacent upright wall portion 430, as well as between upward extending concentric rings 421 and 422, defining an annular exposed region 431 of layer 415. The central circular exposed region 433 of layer 415 is thus defined by the perimeter of inner periphery of ring 422. Further, as illustrated in FIG. 4B an additional layer 410 of conductive material is disposed between layer 415 and the bottom 421 of vessel 445. Further, while layer 415 is preferably copper with a thickness of about 1 to 2 mm, layer 410 is preferably aluminum and has a thickness of about 2 to 5 mm. The outer or supporting rings 421 and 422 are preferably formed of stainless steel, with layers 415 and 410 providing a high thermal conductance for the later and uniform distribution of heat across the inside bottom 421 used as the cooking surface. The middle copper layer, being more thermally conductive than the adjacent surrounding aluminum layer 410 transfers heat absorbed from the burner element or flame laterally before reaching layer 410. Thus, despite the poor heat transfer characteristics of stainless steel used to construct layer 416, the inside bottom surface 421 will have a uniform lateral temperature profile for cooking foodstuff, thus accommodating a range of heating methods and burner or flame configurations that contact the bottom of surface 420 of cooking vessel 400.

Figure 6A:
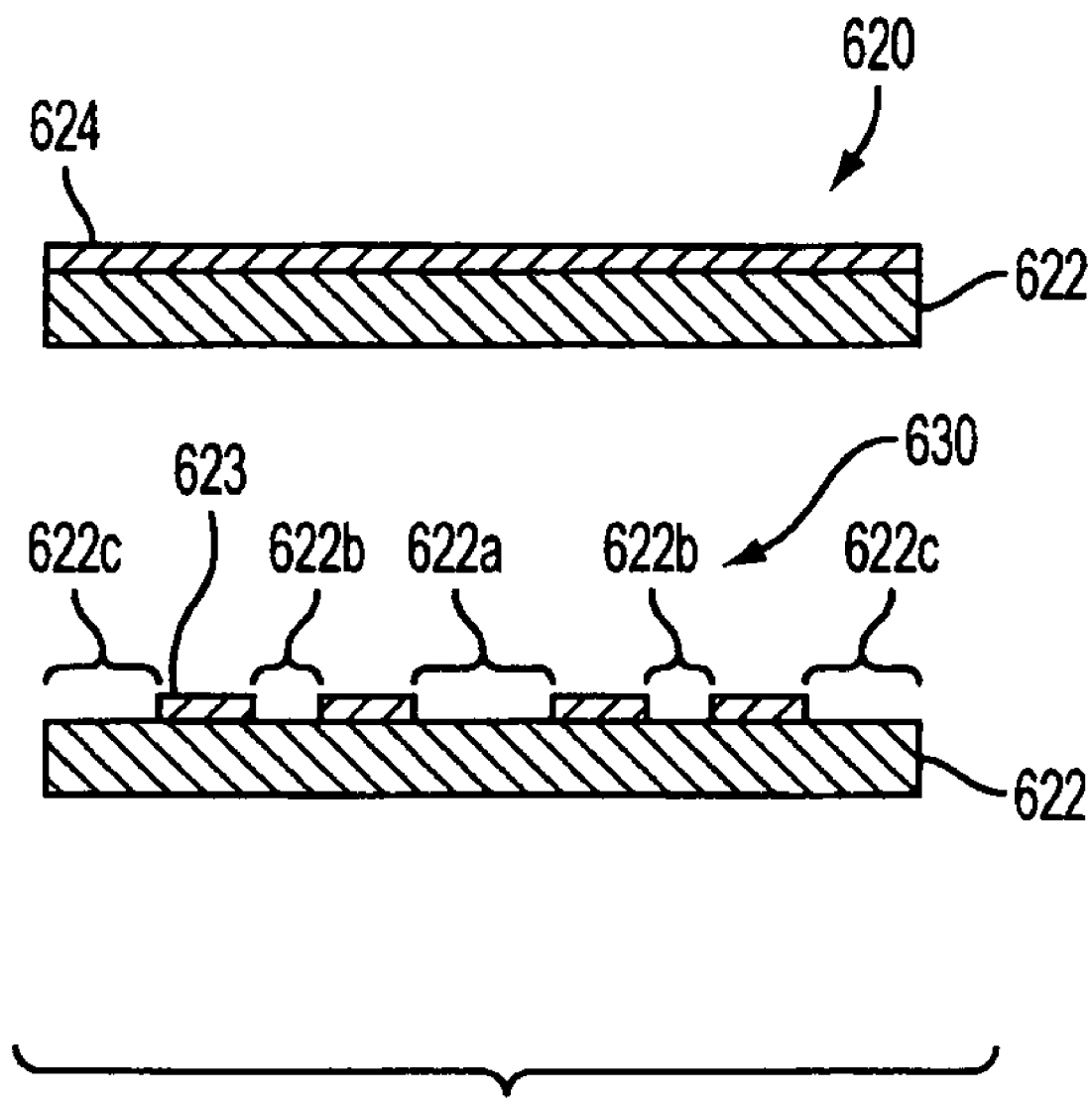
FIGS. 6A, 6B, 6C and 6D are a sequence of cross-sectional elevations to illustrate the steps in constructing the cooking vessels of FIG. 5A and FIG. 5B.

FIGS. 6A, B, C and D are cross-sectional elevations to illustrate multiple stages optionally deployed in constructing the cooking vessel 100, shown in FIGS. 1 and 2, but more preferably to form cooking vessel 400 shown in FIGS. 4 and 5. The initial stage of fabrication is depicted in FIG. 6A, in which a laminate 620 of a copper layer 622 and a stainless steel layer 624 is made or obtained. The laminate is further fabricated to form a circular disc 630 with portion of the stainless steel layer 624 being milled or machined away leaving a sequence of extending annular rings 623 that expose a portion of the underlying copper layer 622, especially those now denoted as a central circular region 622a, and concentrically disposed annular regions 622b surrounding 622a, with the outer annular region 622c, which in turn surrounds region 622b.

Figure 6B:
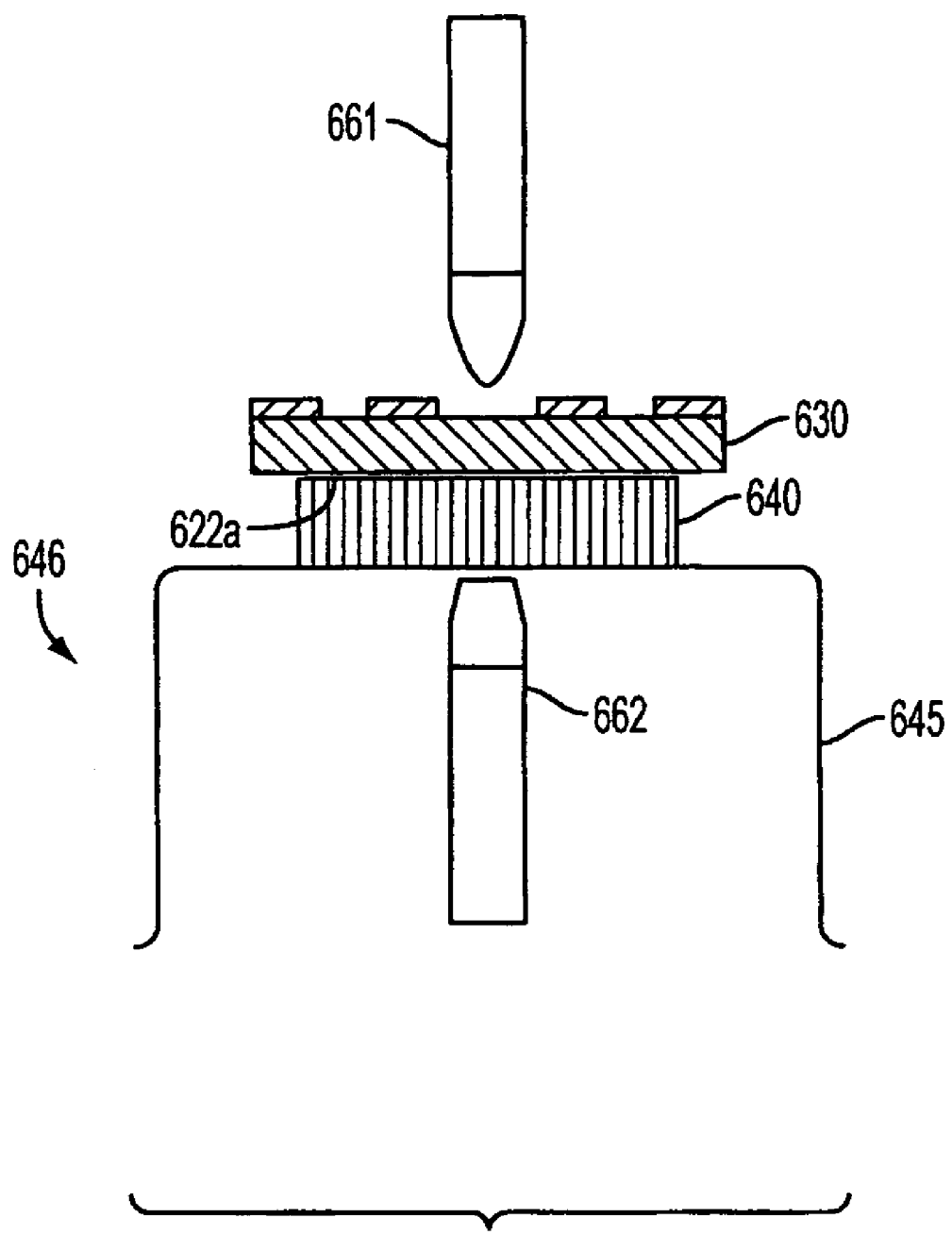

In the subsequent fabrication step, illustrated in FIG. 6B, the circular disc 630 is concentrically aligned with a circular aluminum disc 640 and with a vessel preform 645 with respect to a common axis a line passing through the center of both an upper welding electrode 661 and a lower welding 662. The electrodes 661 and 662 are then energized to weld the assembly together, forming assembly 646, with upper electrode 661 making contact at center of the upper surface of disk 630 and lower welding electrode 662 making contact with the inner bottom surface of vessel preform 645. It should be appreciated that alternatives to this step include bonding two of the three components together by a first separate welding step prior to joining the third component by a second welding step. Although the vertical dimensions in FIG. 6 are exaggerated to be a large multiple of the vertical scale to illustrate the laminate construction, it should be understood that the aluminum disc will generally be thicker than the copper and stainless steel disk, as well as narrower, as the aluminum undergoes significant flow and deformation during the subsequent impact bonding step illustrated in FIG. 6C.

Figure 6C:
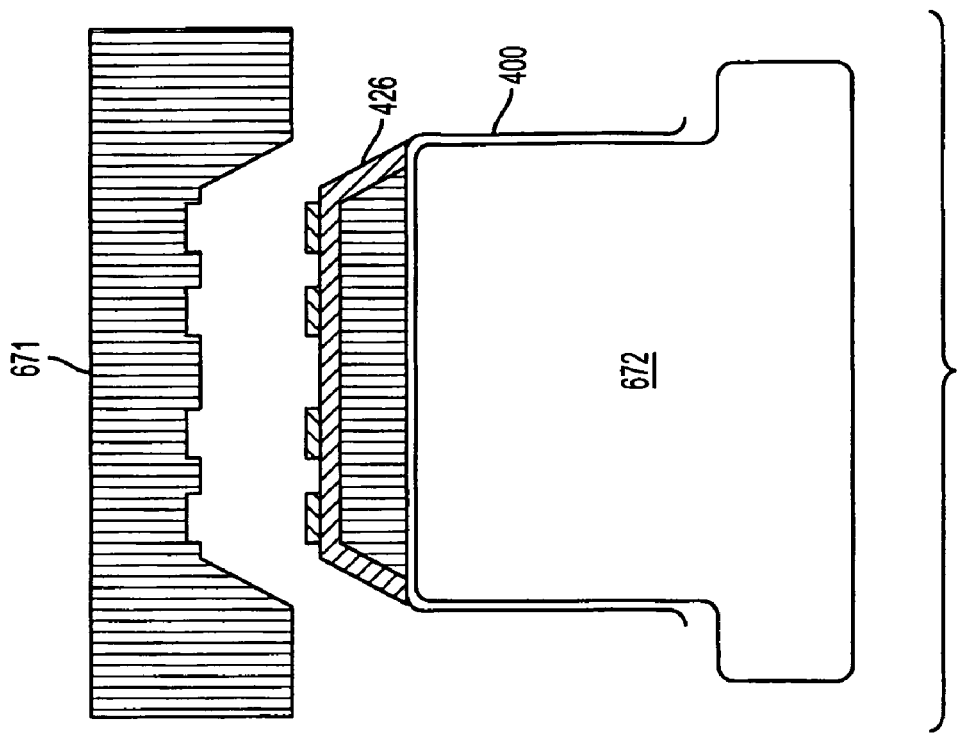

In FIG. 6C, the spot-welded assembly 646 of FIG. 6C is impact bonding using a mating upper die 671. The upper die 671 matches the contour of the exterior profile formed in disk 630 such that sufficient pressure is uniformly applied across entire interface 622a, which is defined as the interface between disk 630 and aluminum disk 640, during impact bonding. In addition, product or brand identifying information is preferably embossed in the copper plate 622 during the impact bonding process in region 622c. Further, prior to impact bonding the lower portion of the assembly 646 is supported by mandrel 672, which is inserted into the fluid containing cavity 440 of vessel 645, matching the interior profile thereof.

Figure 6D:
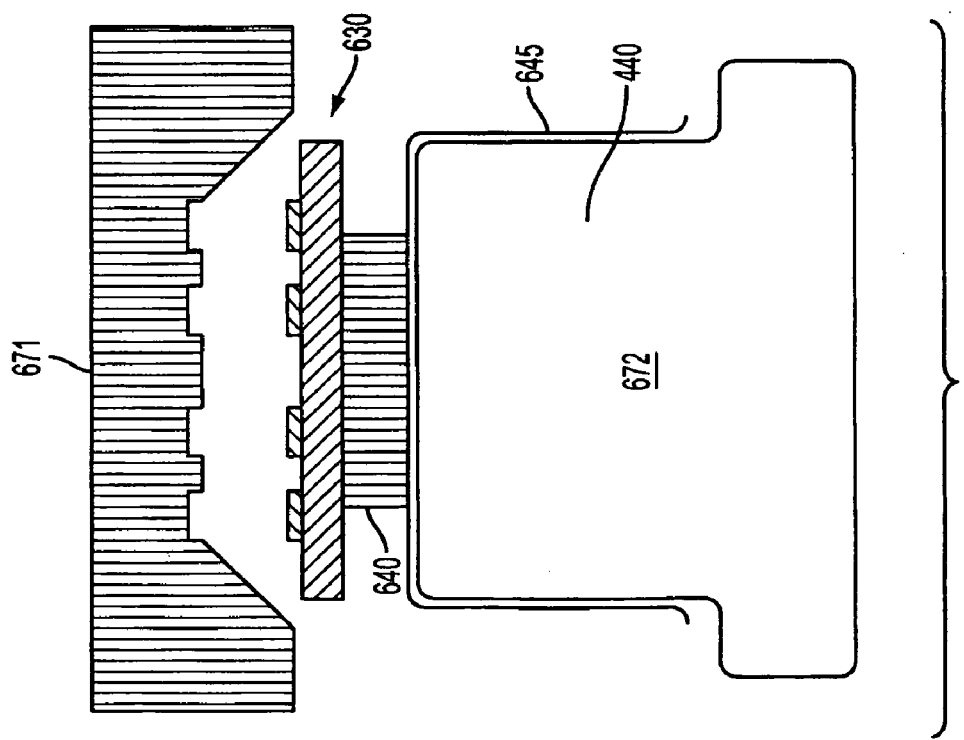

During the step of impact bonding that occurs in transforming the assembly of FIG. 6C into the cooking vessel 400 of FIG. 6D, the profile of the concentric extending rings and recessed regions in disk 630 is preserved. However, the softer aluminum layer 640 is spread by deformation to the lateral edges of vessel portion 645, where it is confined or encapsulated within the continuous copper layer 622. Copper layer 622 is deformed to match the inner edge profile of forming die 671, ultimately forming a sloped bottom edge 426.

Figure 7:
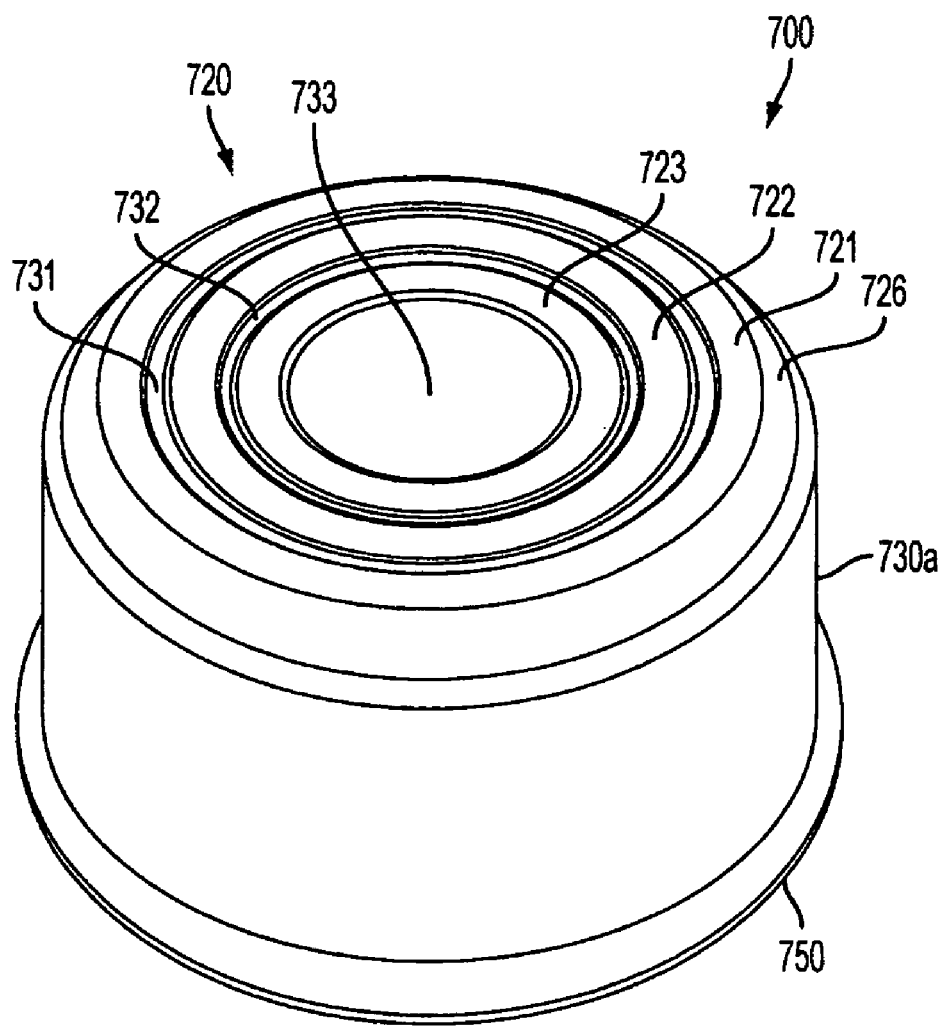
FIG. 7 is a prospective view of the bottom surface of a cooking vessel according to another alternative embodiment of the invention.
Figure 8:
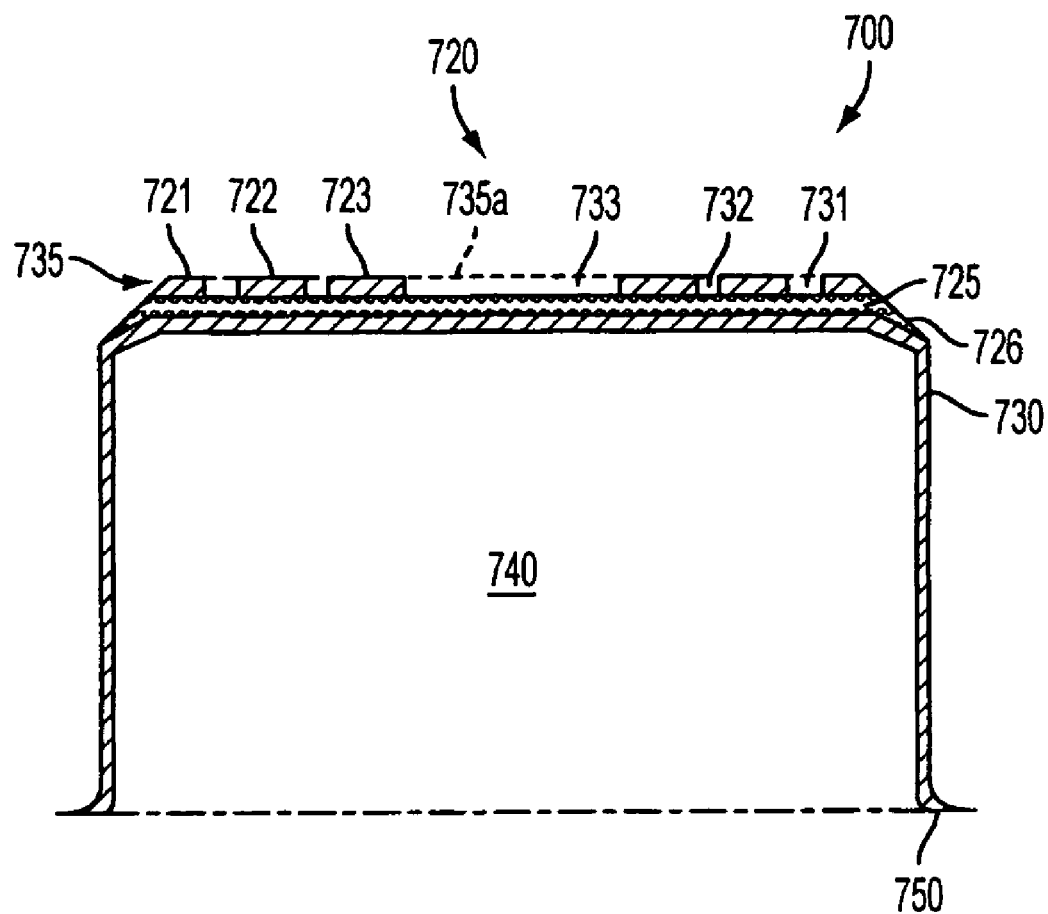
FIG. 8 is a cross-sectional elevation to illustrate the multiple steps in one method of forming the cooking vessel of FIG. 7.

FIG. 7 is a perspective view of cooking vessel 700 according to another alternative embodiment of the invention showing the bottom 720 and the outer surface 730a of upright wall 730 that extends therefrom, surrounding bottom 720 to form a fluid retaining cavity 740 Accordingly, cooking vessel 700 may be considered to be resting on rim 750 for the purposes of this illustration. Referring to the cross-sectional elevation of vessel 700 in FIG. 8, the bottom surface 720 has a pair of concentrically disposed grooves 731 and 732 formed in the outer bottom layer 735 that, along with a central circular recess 733 in the outer bottom layer 735 define three concentric annular rings 721, 722 and 723 that extend from the outer surface 735a of bottom layer 735 and protect the middle layer of copper 725. Note that the middle layer of copper 725 is also visible from the edge of the cooking vessel as surface 726 that form a band surrounding the circumference of wall 730 at the lower section of the cooking vessel 700.

Cooking vessel 700 is optionally fabricated in a manner substantially corresponding to the steps illustrated in FIG. 6. Alternatively, vessel 700 in FIGS. 7 and 8 can be fabricated by first forming the vessel shown in FIG. 1, and thereafter machining or milling annular rings into the bottom outer layer 323 to form annular groves 731 and 732. Alternatively, both the annular grooves 731 and 732 and the central circular region 733 can be formed by milling away portions of a continuous outer layer formed of stainless steel, or any other material or combinations of layers to reveal one or more inner or laminated layers.

It will be apparent to one of ordinary skill in the art that the construction and fabrication methods are readily modified by providing additional layers to any of the laminated portions described above, or subdividing any of the laminated components into laminates that contain additional layers, as may be preferred to enhance the bonding or adhesion of various materials during the impact bonding process.

Further, it should be understood that the middle layer to be exposed need not be continuous across the entire bottom surface of the cooking vessel, but is preferably continuous in those portions in which subsequent exposure is intended. Accordingly it should be appreciated that the copper layers described above can be bonded between one or more rings or disks of other materials, with the annular or circular regions between the disks being a continuous copper layer, and the other regions of the copper having perforations so that a stronger bond is formed between the surrounding layers where they meet at the holes or perforation in the copper, such that they bond and thus embed the copper disk or preform there between.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A cooking vessel, comprising:
   a) a bottom portion with an interior cooking surface and an exterior portion having,
      i) one or more recessed annular rings or disks, each concentrically disposed about the central axis of the cooking vessel,
      ii) wherein the region between the recessed annular rings or disks defines a continuous horizontal reference plane for supporting the cooking vessel on planar horizontal surface,
   b) substantially vertical walls extending from and surrounding said bottom portion which terminate at a rim to form an inner cavity for containing fluids,
   c) a layer of thermally conductive material having a continuous planar surface on each side interposed between the interior cooking surface and the exterior portion of said bottom portion, wherein a region of the thermally conductive material is exposed coincident with at least one of the annular recessed rings or disks in the exterior portion of said bottom portion of the cooking vessel,
   d) whereby when the bottom portion of the cooking vessel rests on a horizontal supporting surface, the exposed portions of said thermally conductive material are precluded from contacting the horizontal supporting surface.

2. A cooking vessel according to claim 1 wherein said thermally conductive material and the exterior of said bottom portion have a contrasting appearance.

3. A cooking vessel according to claim 1 wherein said thermally conductive material and the exterior of said bottom portion have contrasting colors.

4. A cooking vessel according to claim 1 wherein said thermally conductive material comprises copper and said bottom portion comprises stainless steel.

5. A cooking vessel according to claim 1 wherein the bottom portion is circular.

6. A cooking vessel comprising:
   a) a substantially cylindrical fluid containing vessel with a bottom having a first diameter and substantially upright surrounding sides
   b) a thermally conductive material having a first side disposed in thermal communication with the bottom of said fluid containing vessel
   c) a supporting structure attached to the second side of the thermally conductive material, the supporting structure comprising;
      i) a central disk or ring disposed symmetrically about the central axis of said cylindrical fluid containing vessel,
      ii) one or more annular rings disposed symmetrically about the central disk or ring, each annular ring and the central ring or disk have substantially the same thickness,
      iii) wherein there is at least one annular gap between two or more of the annular rings and central ring or disk,
      iv) whereby the annular gap exposes said thermally conductive material between each ring or disk of said supporting structure such that said supporting structure protects said thermally conductive material, preventing contact with a substrate on which the supporting structure is disposed.

7. A cooking vessel according to claim 6 wherein said thermally conductive material is exposed to view between the rings of said supporting structure.

8. A cooking vessel according to claim 6 wherein said thermally conductive material comprises a copper layer.

9. A cooking vessel according to claim 8 further wherein the copper layer extends to the periphery of said bottom portion of the cooking vessel and extends upward around a least a lower external portion of said vertical wall surface.

10. A cooking vessel according to claim 9 wherein the portion of the copper layer that extends to the periphery of said bottom portion of the cooking vessel is visually contiguous with the portion that extends upward around a least a lower external portion of said vertical wall surface.

11. A cooking vessel according to claim 6 wherein the supporting structure is stainless steel.

12. A cooking vessel according to claim 11 further comprising at least one layer of aluminum interposed between the exposed thermally conductive material and the interior cooking surface.

13. A cooking vessel according to claim 12 wherein said thermally conductive material comprises copper.

14. A cooking vessel according to claim 12 wherein said thermally conductive material is an alloy of copper.

15. A method of forming a cooking vessel, the method comprising:
   a) providing a preformed internal body having a substantially circular bottom with an outer surface and an inner surface, the bottom surrounded by upward extending walls that terminate at a rim portion to form a fluid retaining cavity that includes the inner surface of the circular bottom,
   b) providing a lamination assembly including;
      i) a circular thermally conductive disk having a first continuous and substantially planar inner surface of the lamination assembly and a second continuous and substantially planar surface,
      ii) at least one annular protective plate having a first surface to form the outer surface of the lamination assembly and a continuous and substantially planar second surface to be disposed on the second surface of the thermally conductive disk,
   c) attaching the inner surface of the lamination assembly to the outer surface of the internal body wherein the second surface of the annular protective plate is attached to the second surface of the circular thermally conductive disk whereby portions of the second surface of the circular thermally conductive disk are covered by the annular protective plate and other portions of the circular thermally conductive disk within the annular opening are recessed above the outer surface of the lamination assembly whereby they are protected from making contact with a surface on which the completed cookware article is resting upon,
   d) wherein the first and second surface of the thermally conductive disks are substantially planar after said step of attaching the inner surface of the lamination assembly to the outer surface of the internal body.

16. The method of claim 15 further wherein said step of attaching the lamination assembly to the outer surface of the internal body further comprises;
   a) interposing an aluminum disk there between,
   b) impact bonding the lamination assembly, aluminum disk and internal body.

17. The method of claim 16 wherein said step of attaching the lamination assembly to the outer surface of the internal body further comprises;
   a) concentrically aligning the lamination assembly, aluminum disk and internal body,
   b) spot welding the concentrically aligned assembly of the lamination assembly, aluminum disk and internal body together at the center thereof prior to said step of impact bonding.

18. The method of claim 17 wherein said step of impact bonding further comprises deploying an upper forming die having a substantially complimentary contour as that presented by the first surface of the annular protective plate when concentrically aligned and disposed on the second surface of said thermally conductive disk.

19. The method of claim 16 wherein said step of impact bonding extrudes at least a portion of the aluminum layer into a vertically extending cavity formed between the periphery of the circular bottom of the preformed internal body and the adjacent portion of the thermally conductive disk.

20. The method of claim 19 wherein the thermally conductive disks extend to the periphery of the bottom of the preformed internal body and extends upward around a least a lower external portion thereof so as to be visible from the outside of the cooking vessel.

21. A method of forming a cooking vessel, according to claim 15 wherein the protective plate is comprised of stainless steel and the thermally conductive disk is comprised of copper.

22. A method of forming a cooking vessel, the method comprising:

a) providing a preformed internal body having a substantially circular bottom with an outer surface and an inner surface, the bottom surrounded by upward extending walls that terminate at a rim portion to form a fluid retaining cavity that includes the inner surface of the circular bottom,
b) providing a lamination assembly including;
  i) a circular thermally conductive disk having a first continuous and substantially planar inner surface of the lamination assembly and a second surface that consists of a first portion, and the remainder of the second surface being the second portion,
  ii) at least one annular protective plate having a first surface to form the outer surface of the lamination assembly and a continuous and substantially planar second surface to be disposed on the first portion of the second surface of the thermally conductive disk,
c) attaching the inner surface of the lamination assembly to the outer surface of the internal body wherein;
  i) whereby the first portion of the second surface of the circular thermally conductive disk is attached to and covered by the annular protective plate, and
  ii) the second portion of the thermally conductive disk is recessed above the outer surface of the lamination assembly and thereby protected from making contact with a surface on which the completed cookware article is resting upon.

* * * * *